(12) United States Patent
Hatanaka et al.

(10) Patent No.: US 8,268,473 B2
(45) Date of Patent: Sep. 18, 2012

(54) ELECTRODE PLATE FOR NON-AQUEOUS ELECTROLYTE SECONDARY BATTERY AND NON-AQUEOUS ELECTROLYTE SECONDARY BATTERY USING THE SAME

(75) Inventors: Tsuyoshi Hatanaka, Wakayama (JP); Kenichi Nishibata, Wakayama (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 12/664,327

(22) PCT Filed: Jul. 8, 2008

(86) PCT No.: PCT/JP2008/001818
§ 371 (c)(1),
(2), (4) Date: Dec. 11, 2009

(87) PCT Pub. No.: WO2009/008160
PCT Pub. Date: Jan. 15, 2009

(65) Prior Publication Data
US 2010/0221607 A1    Sep. 2, 2010

(30) Foreign Application Priority Data

Jul. 9, 2007  (JP) ................................ 2007-179544
Jul. 7, 2008  (JP) ................................ 2008-177288

(51) Int. Cl.
*H01M 2/14*  (2006.01)
*H01M 2/18*  (2006.01)
*H01M 2/16*  (2006.01)

(52) U.S. Cl. ......................... 429/131; 429/130; 429/246

(58) Field of Classification Search .................. 429/131, 429/130, 246
See application file for complete search history.

(56) References Cited

U.S. PATENT DOCUMENTS

| 6,335,114 | B1  | 1/2002 | Ueshima et al. |
| 7,097,673 | B2* | 8/2006 | Dudley et al. ............... 29/623.5 |
| 2006/0234117 | A1 | 10/2006 | Fujikawa et al. |

FOREIGN PATENT DOCUMENTS

| JP | 07-220759 | 8/1995 |
| JP | 2001-093583 | 4/2001 |
| JP | 2005-190787 | 7/2005 |
| JP | 2006-318892 | 11/2006 |

* cited by examiner

*Primary Examiner* — Helen O Conley
(74) *Attorney, Agent, or Firm* — McDermott Will & Emery LLP

(57) ABSTRACT

A non-aqueous electrolyte secondary battery of the present invention comprises a long core member and a material mixture layer formed thereon. The electrode plate has an exposed part of the core member formed along one side which is parallel to the longitudinal direction of the core member. The material mixture layer comprises a material that can absorb and desorb lithium ions. A porous film is formed on at least a part of the exposed part of the core member adjacent to an edge face of the material mixture layer and on the material mixture layer and is parallel to the exposed portion of the core member, and the thickness of the porous film is greater at the edge face of the material mixture layer which is parallel to the exposed part of the core member and located on the side of the exposed part of the core member than at a central portion of the material mixture layer in the width direction thereof.

5 Claims, 1 Drawing Sheet

ELECTRODE PLATE FOR NON-AQUEOUS ELECTROLYTE SECONDARY BATTERY AND NON-AQUEOUS ELECTROLYTE SECONDARY BATTERY USING THE SAME

RELATED APPLICATIONS

This application is the U.S. National Phase under 35 U.S.C. §371 of International Application No. PCT/JP2008/001818, filed on Jul. 8, 2008, which in turn claims the benefit of Japanese Application Nos. 2007-179544, filed on Jul. 9, 2007 and 2008-177288, filed on Jul. 7, 2008, the disclosures of which Applications are incorporated by reference herein.

TECHNICAL FIELD

The present invention relates to a non-aqueous electrolyte secondary battery and particularly an improvement of an electrode plate for the same.

BACKGROUND ART

In recent years, with the rapidly growing of portable and cordless electronic devices, there has been advancement in putting, as a power source for driving these devices, non-aqueous electrolyte secondary batteries having a high voltage and a high energy density into practical use. Technical development of non-aqueous electrolyte secondary batteries has been accelerated not only for small-sized consumer products but also as large-sized batteries having a large capacity for the purpose of energy storage, electric vehicles and the like. For example, there has been a progress in applying non-aqueous electrolyte secondary batteries to high-output purposes such as electric tools and hybrid electric vehicles (HEV) by contriving the electrode structure and the current collector structure of the same.

The non-aqueous electrolyte secondary battery as mentioned above has a wound-type electrode group comprising belt-shaped positive and negative electrodes each composed of a material mixture layer and a core member, and a separator interposed between the positive electrode and the negative electrode. The separator has a role of electrically insulating the positive electrode and the negative electrode while retaining the non-aqueous electrolyte, and a sheet of a microporous thin film mainly composed of polyethylene having a thickness of several tens of μm is used as the separator.

Several contrivances can be thought of in applying the non-aqueous electrolyte secondary battery into high-output purposes as described in the following. The thickness of the positive electrode and the negative electrode is rendered smaller and the surface area thereof is enlarged. Further, in each of the positive electrode and the negative electrode, an exposed part of a core member is formed along one side which is parallel to the longitudinal direction of the electrode. For example, in the wound-type electrode group, an exposed part of the positive electrode core member is disposed at one end face in the winding axis direction and an exposed part of the negative electrode core member is disposed at the other end face. A positive electrode current collector terminal and a negative electrode current collector terminal are connected to the exposed part of the positive electrode core member and the exposed part of the negative electrode core member, respectively. In this manner, an electron transmission path can be secured thoroughly in the belt-shaped electrode and therefore the high-output characteristics can be improved.

In general, since the non-aqueous electrolyte secondary batteries such as lithium ion secondary batteries have a higher energy density per unit volume as compared to nickel-metal hydride storage batteries and lead acid batteries, the technique for assuring the safety is critical. For example, in order to prevent occurrence of internal short circuits, a proposition has been made to form a porous film on the surface of either the positive electrode material mixture layer or the negative electrode material mixture layer (see Patent Document 1).
Patent Document 1: Japanese Laid-Open Patent Publication Hei 7-220759 (Patent Publication No. 3371301)

DISCLOSURE OF THE INVENTION

Problem to be Solved by the Invention

As described in the above, in order to improve the high-output characteristics, the exposed part of the core member is formed along one side which is parallel to the longitudinal direction of the electrode in each of the positive electrode and the negative electrode. Then, the exposed part of the positive electrode core member is disposed on one end face in the winding axis direction of the wound-type electrode group and the exposed part of the negative electrode core member is disposed on the other end face. Further, the exposed part of the positive electrode core member and the exposed part of the negative electrode core member are connected to the positive electrode current collector terminal and the negative electrode current collector terminal, respectively.

In this occasion, if a porous film is to be formed on the entire surface of the material mixture layer, the porous film is also formed on the exposed part of the core member. However, since the current collector terminal is welded to the exposed part of the core member, the porous film should be formed not on the entire exposed part but only on a portion of the exposed part.

Further, in the electrode where the exposed part of the core member is formed along one side which is parallel to the longitudinal direction, the thickness of the material mixture layer located on the edge portion in the width direction of the electrode gradually becomes smaller to make a shape of so-called "sag".

The porous film formed on the material mixture layer has a heat-resistant property and an insulating property, and it has a function of protecting the battery from smoking or firing even when internal short circuiting occurs. For this reason, the porous film needs a thickness of a certain degree. The minimum thickness required for the porous film is determined from the amount of heat generated at the time of an internal short circuit of the battery, and taking unevenness in the manufacture process into account, the thickness of the porous film when actually manufactured is decided. The porous film can be produced by using processes such as gravure coating, spray coating, die coating and the like.

A vertical cross section which is parallel to the width direction of a conventional electrode plate on which a porous film is formed is described with reference to FIG. 1. In FIG. 1, an electrode plate 1 comprises a core member 2 and a material mixture layer 3 containing an active material formed on each surface thereof. An exposed part 2a of a current collector is formed along one side which is parallel to the longitudinal direction of the electrode plate 1. A porous film 4 is formed on at least a portion of the exposed part 2a of the core member and on the material mixture layer 3. The thickness of an edge portion (sag portion) 3a of the material mixture layer 3 on the side of the exposed part of the core member is smaller than other portion of the material mixture layer, and therefore the amount of the active material contained in the edge portion 3a is smaller than other portion of the material mixture layer. The thickness of the porous film 4 is the same on the edge portion 3a as on other portion of the material mixture layer.

Next, in FIG. 2, the arrangement of the positive electrode and the negative electrode in a lithium ion secondary battery is shown in a vertical cross section which is parallel to the width direction of the electrode plate.

A positive electrode 10 includes a positive electrode core member 11 and a positive electrode material mixture layer 12 formed on each surface thereof. In the positive electrode 10, an exposed part 11a of the positive electrode core member 11 is formed along one side which is parallel to the longitudinal direction thereof. The negative electrode 13 includes a negative electrode core member 14 and a negative electrode material mixture layer 15 formed on each surface thereof. In the negative electrode 13, an exposed part 14a of the negative electrode core member 14 is formed along one side which is parallel to the longitudinal direction thereof. In FIG. 2, a porous film 17 is formed on at least a portion of the exposed part of the negative electrode core member and on the negative electrode material mixture layer.

As shown in FIG. 2, in the electrode group, the positive electrode 10 and the negative electrode 13 are opposed to each other with a separator 16 interposed between them. The exposed part 11a of the positive electrode core member 11 and the exposed part 14a of the negative electrode core member 14 are disposed in the direction opposite to each other.

Also, the negative electrode 11 is longer in the width direction than the positive electrode 10, and the entire surface of the positive electrode material mixture layer 12 of the positive electrode 10 in the direction perpendicular to the positive electrode core member 11 is opposed to the negative electrode material mixture layer 15. However, the positive electrode material mixture layer 12 is not opposed to the edge portion 15a of the negative electrode material mixture layer 15 having a smaller thickness on the side of the exposed part of the negative electrode core member. The amount of the active material included in the edge portion 15a of the negative electrode material mixture layer 15 is smaller as compared to the other portion. For this reason, in case the positive electrode material mixture layer 12 is opposed to the edge portion 15a of the negative electrode material mixture layer 15, metallic lithium may possibly be deposited on the edge portion 15a at the time of the charge. In order to prevent this, the positive electrode material mixture layer 12 is not opposed to the edge portion 15a of the negative electrode material mixture layer 15.

It is noted that, in the use environment such as HEV typically, vibration is readily added to the battery, and there is a concern that this vibration may cause displacement of winding, for example. In the case where displacement of winding is caused and the positive electrode material mixture layer is opposed to the portion of the negative electrode material mixture layer having a smaller thickness, as the amount of the active material is smaller in the portion of the negative electrode material mixture layer having a smaller thickness, metallic lithium may possibly be deposited on the negative electrode. Further, in the case where an internal short circuit occurs, the amount of heat generated is large because metallic lithium is deposited, and therefore an inconvenience may happen that the battery generates heat even if the porous film is formed on the negative electrode material mixture layer.

Means for Solving the Problem

The non-aqueous electrolyte secondary battery according to the present invention comprises a long core member and a material mixture layer formed thereon. The electrode plate has an exposed part of the core member formed along one side which is parallel to the longitudinal direction of the core member. The material mixture layer includes a material that can absorb and desorb lithium ions. A porous film is formed on the material mixture layer and at least a part of the exposed part of the core member adjacent to an edge face of the material mixture layer, the exposed part being on the same side as the face of the core member on which the material mixture layer is formed, and the thickness of the porous film is greater at the edge face of the material mixture layer which is parallel to the exposed part of the core member and located on the side of the exposed part of the core member than at a central portion of the material mixture layer in the width direction thereof.

The thickness of the porous film means the thickness of the porous film in the direction perpendicular to the surface of the material mixture layer. The central portion in the width direction of the material mixture layer means the central point between the both edges in the width direction of the material mixture layer and the vicinity thereof.

It is preferable that, in the direction perpendicular to the core member, the sum of the thickness of the core member, the thickness of the material mixture layer and the thickness of the porous film at the edge face of the material mixture layer is equal to or less than the sum of the thickness of the core member, the thickness of the material mixture layer and the thickness of the porous film at the central portion of the material mixture layer.

It is preferable that the porous film comprises at least one selected from the group consisting of a film including an insulating filler and a binder, and a film including a heat-resistant resin.

Also, the present invention relates to a non-aqueous electrolyte secondary battery comprising an electrode group including a positive electrode, a negative electrode and a separator interposed between them, a non-aqueous electrolyte and a battery case housing the electrode group and the non-aqueous electrolyte, wherein at least one of the positive electrode and the negative electrode is the above-described electrode plate. It is more preferable that each of the positive electrode and the negative electrode is the above-described electrode plate, respectively. It is preferable that the above electrode group is a wound-type electrode group or a laminate-type electrode group.

EFFECT OF THE INVENTION

In the electrode plate according to the present invention, the thickness of the porous film formed on the edge portion of the material mixture layer having a smaller thickness is rendered larger than the thickness of the porous film formed on the central portion of the material mixture layer. By using the electrode plate according to the present invention as the electrode plate in the non-aqueous electrolyte secondary battery, it is possible to inhibit occurrence of internal short circuiting even in the case where metallic lithium is deposited. Therefore, the present invention can provide a highly reliable non-aqueous electrolyte secondary battery.

BEST MODE FOR CARRYING OUT THE INVENTION

Figure 3:
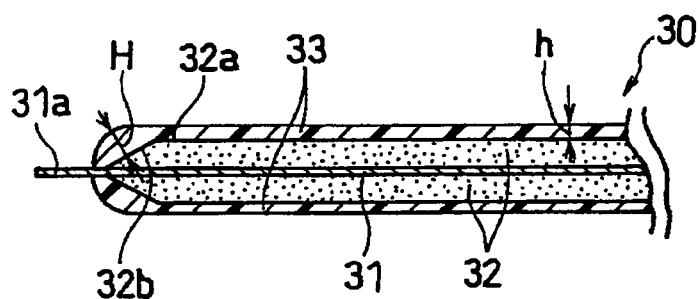
FIG. 3 is a vertical sectional view showing schematically the electrode plate according to one embodiment of the present invention.

The electrode plate for non-aqueous electrolyte secondary battery according to the present invention will be described with reference to drawings. FIG. 3 shows an electrode plate for non-aqueous electrolyte secondary battery according to one embodiment of the present invention. FIG. 3 is a vertical sectional view which is parallel to the width direction (direction perpendicular to the longitudinal direction) of the electrode plate according to the present invention.

In FIG. 3, an electrode plate 30 for non-aqueous electrolyte secondary battery comprises a long core member 31 and a material mixture layer 32 containing an active material formed on each surface thereof. The electrode plate 30 has an exposed part 31a of the core member formed along one side which is parallel to the longitudinal direction of the core member. The active material comprises a material that can absorb and desorb lithium ions. A porous film 33 is formed on the material mixture layer 32 and at least a part of the exposed part 31a of the core member adjacent to an edge face of the material mixture layer, the exposed part being on the same side as the core member 31 on which the material mixture layer 32 is formed. A thickness H (first thickness) of the porous film located at the edge face 32b which is parallel to the exposed part 31a of the core member and located on the side of the exposed part of the core member is larger than a thickness h (second thickness) of the porous film located at the central portion in the width direction of the material mixture layer.

As described in the above, in the conventional electrode plate on which the exposed part of the core member is formed along the longitudinal direction of the core member, the thickness of the edge portion of the material mixture layer along the exposed part of the core member is smaller than the thickness of other portion of the material mixture layer.

Figure 2:
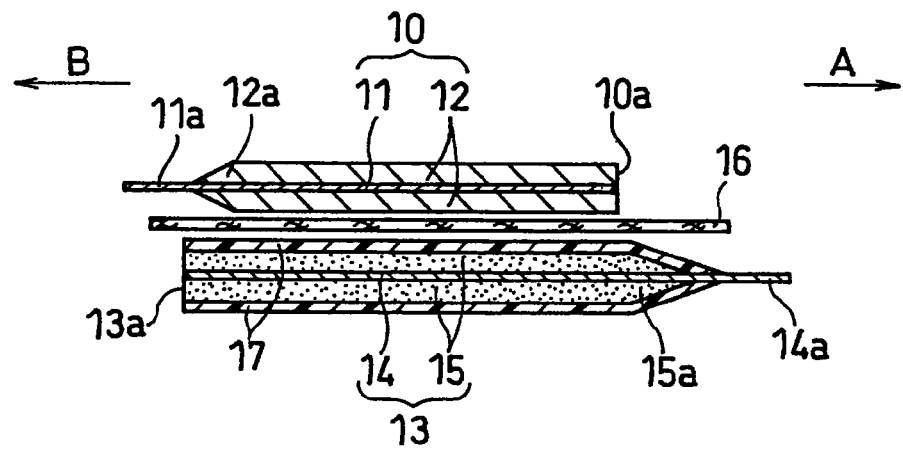
FIG. 2 is a vertical sectional view showing an example of the positional relation between the positive electrode plate and the negative electrode plate in a non-aqueous electrolyte secondary battery.

For example, in the electrode group where the positive electrode and the negative electrode are arranged as shown in FIG. 2, in the case where the positive electrode is moved to the direction of an arrow A (direction A) of FIG. 2 relative to the negative electrode by vibration or shock etc., the edge portion 15a (corresponding to the edge portion 32a of FIG. 3) of the negative electrode material mixture layer having a smaller thickness is opposed to the positive electrode material mixture layer. In the case where the positive electrode active material is the supply source of ions in charge of the charge and discharge (lithium ions, for example), as the amount of the negative electrode active material is relatively smaller on the edge portion 15a of the negative electrode material mixture layer, metallic lithium may possibly be deposited on the edge portion 15a.

In this case, it is preferable that the electrode plate 30 as shown in FIG. 3 is used as the negative electrode. That is, in the negative electrode, the thickness H (first thickness) of the porous film 33 formed on the edge face 32b of the material mixture layer 32 (i.e. on the edge portion 32a) is rendered larger than the thickness h (second thickness) of the porous film 33 located at the central portion in the width direction of the material mixture layer. In other words, the thickness H of the porous film formed on the edge portion 32a of the material mixture layer 32 is rendered larger than the thickness h of the porous film formed on other portion of the material mixture layer 32. It is noted that the thickness of the porous film located at the central portion in the width direction of the material mixture layer represents the thickness of the porous film formed on the portion other than the edge portion 32a of the material mixture layer 32.

In the case where the thickness of the material mixture layer is changed at the edge portion 32a, the thickness of the porous film formed on the edge portion 32a may also be changed. In this case, it is preferable that the thickness of the porous film formed on the edge portion 32a is larger than the second thickness at any location on the edge portion 32a.

The first thickness H of the porous film formed on the edge portion 32a where the thickness of the material mixture layer gradually becomes smaller can be the largest thickness of the porous film on the edge portion 32a, for example.

Even in the case where the positive electrode is relatively displaced to the direction A as shown in FIG. 2 and the edge portion 32a of the negative electrode material mixture layer is opposed to the edge portion 10a of the positive electrode material mixture layer on the side opposite to the side of the exposed part of the positive electrode core member, it is possible to allow metallic lithium to be deposited in the porous film by rendering the first thickness H of the porous film formed on the negative electrode larger than the second thickness h. Even in case a short circuit current flows and metallic lithium reacts with the non-aqueous electrolyte to generate heat, as the deposited metallic lithium is present in the porous film as described above, it is possible to prevent the direct transmission of heat to the separator or decrease the amount of heat transmitted directly to the separator.

Also, the positive electrode may possibly be displaced relatively to the direction of an arrow B of FIG. 2 by vibration or shock etc. Specifically, the edge portion 12a of the positive electrode material mixture layer having a smaller thickness on the side of the exposed part of the positive electrode core member may be moved outside the edge portion 13a of the negative electrode on the side opposite to the side of the exposed part 14a of the negative electrode core member.

In this case, it is preferable to use the electrode plate 30 as shown in FIG. 3 as the positive electrode.

In the case where the positive electrode is moved relatively to the direction B, metallic lithium is deposited in the vicinity of the edge portion 13a of the negative electrode plate. Even if the deposited metallic lithium penetrates the separator, as the porous film is formed on the positive electrode, it is possible to prevent the metallic lithium to be directly in contact with the positive electrode material mixture layer. In particular, if the position of the electrode plates with each other is displaced, it is highly probable that the edge portion 12a of the positive electrode material mixture layer is opposed to the vicinity of the edge portion 13a of the negative electrode plate where metallic lithium is deposited. In the electrode plate according to the present invention, as the thickness of the porous film formed on the edge portion of the material mixture layer having a smaller thickness is rendered larger, the influence of heat to the environment can be reduced to minimum in the same manner as above.

As describe in the above, the reliability of the non-aqueous electrolyte secondary battery can be further improved by the fact that at least one of the positive electrode and the negative electrode included in the non-aqueous electrolyte secondary battery is the electrode plate according to the present invention.

In the present invention, it is particularly preferable that each of the positive electrode and the negative electrode is the electrode plate according to the present invention, respectively. By this, the reliability of the non-aqueous electrolyte secondary battery can be further improved even in the case where the positive electrode is displaced relatively to any of the direction A and the direction B. That is, the reliability of the non-aqueous electrolyte secondary battery can be remarkably improved by the fact that each of the positive electrode and the negative electrode is the electrode plate according to the present invention, respectively.

Figure 4:
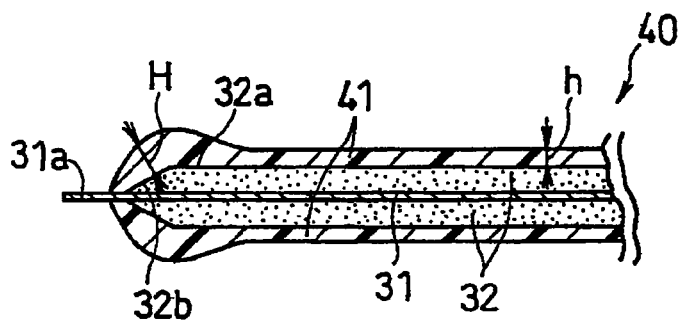
FIG. 4 is a vertical sectional view showing schematically the electrode plate according to another embodiment of the present invention.

The electrode plate according to the present invention can take a configuration as shown in FIG. 4. FIG. 4 is a vertical sectional view showing an electrode plate according to another embodiment of the present invention. In FIG. 4, the same components as in FIG. 3 are given the same reference numbers.

In an electrode plate 40 of FIG. 4, the thickness of a porous film 41 formed in the vicinity of the edge portion 32a of the material mixture layer is rendered larger than in the electrode plate 30 of FIG. 3. Specifically, the total thickness of the electrode plate in the vicinity of the edge portion 32a is larger than the total thickness of the electrode plate in the vicinity of the central portion of the material mixture layer.

The first thickness H is changed suitably according to the design of the electrode plate.

It is preferable that a difference (H-h) between the first thickness H and the second thickness h is 1 to 4 μm. In the case where the difference (H-h) is too large, the electrode plate may possibly be broken when the electrode plate as long as several thousand meters are wound up in a roll shape during the production process. In the case where the difference (H-h) is too small, the effect of the present invention may not possibly be obtained sufficiently.

As shown in FIG. 3, in the present invention, it is preferable that the thickness of the electrode plate at the edge face of the material mixture layer is equal to or less than the thickness of the electrode plate at the central portion of the material mixture layer. For example, in the case where the electrode plate comprises a core member and a material mixture layer formed on each surface thereof, it is preferable that the sum of the thickness of the core member, the thickness of each material mixture layer and the thickness of each porous film at the edge face of the material mixture layer (thickness at the edge portion of the electrode plate) is equal to or less than the sum of the thickness of the core member, the thickness of each material mixture layer and the thickness of each porous film at the central portion of the material mixture layer (thickness at the central portion of the electrode plate). Herein, the thickness of the electrode plate is the thickness in the direction perpendicular to the core member.

In case the thickness at the edge portion of the electrode plate is larger than the thickness at the central portion of the electrode plate, the electrode plate may be cut or broken when the electrode plate is wound up in a roll shape during mass production processes.

It is noted that, in the case where the thickness of the material mixture layer gradually becomes smaller at the edge portion 32a, the thickness at the edge portion of the electrode plate can be the thickness of the electrode plate at the edge face 32b where the thickness of the porous film formed on the edge face 32b is the largest (largest thickness position).

The porous film may be a film comprising a heat-resistant resin or a film comprising an insulating filler and a binder.

As a heat-resistant resin, materials having a lower thermal conductivity than the positive electrode core member and the negative electrode core member can be used. Examples of such a material include polyimide, polyamide imide, aramid, polyphenylene sulfide, polyether imide, polyethylene terephthalate, polyether nitrile, polyether ether ketone, polybenzimidazole etc.

As the insulating filler, an inorganic oxide is preferably used. As the inorganic oxide, it is preferable to use a material that does not have a bad influence on the battery characteristics due to impregnation with the non-aqueous electrolyte at the time of battery use and that does not cause a side reaction having a bad influence on the battery characteristics even under oxidation reduction potential. Examples of such materials include inorganic porous material such as alumina, zeolite, silicon nitride, silicon carbide, titanium oxide, zirconium oxide, magnesium oxide, zinc oxide and silicon dioxide. It is preferable that the above materials are high in purity. The above materials can be used singly or in combination of two or more thereof.

As the binder, polyethylene (PE), polypropylene (PP), polytetrafluoroethylene (PTFE), polyvinylidene fluoride (PVDF), styrene butadiene rubber (SBR), rubber-like polymers including acrylonitrile units. These materials can be used singly or in combination of two or more thereof. The binder contained in the porous film preferably contains at least an amorphous and high heat-resistant rubber-like polymers including acrylonitrile units.

It is preferable that the weight ratio of the insulating filler to the binder is 99:1 to 80:20.

The porous film can be formed directly onto the positive electrode material mixture layer and/or the negative electrode material mixture layer.

In the following, a method for forming the porous film comprising an insulating filler and a binder is described as an example.

The porous film comprising an insulating filler and a binder can be formed in the following manner, for example.

An insulating filler, a binder and a dispersion medium are mixed in a prescribed ratio to obtain a paste. The obtained paste is applied onto a core member with the gravure roll method, for example, in such a manner that an exposed part of the core member is formed along one side which is parallel to the longitudinal direction thereof. The thickness of the porous film formed on the portion of the material mixture layer having a smaller thickness can be controlled by adjusting the depth of the groove of the gravure roll corresponding to the above portion.

It is noted that, if the thickness of the porous film formed on the portion of the material mixture layer having a smaller thickness can be rendered larger, the method for applying the paste is not limited to the gravure roll method.

The electrode plate according to the present invention is used as the electrode plate for non-aqueous electrolyte secondary battery as mentioned above. The non-aqueous electrolyte secondary battery can include an electrode group comprising a positive electrode, a negative electrode and a separator interposed therebetween, a non-aqueous electrolyte, and a battery case housing the electrode group and the non-aqueous electrolyte. It is preferable that at least one of the positive electrode and the negative electrode included in the non-aqueous electrolyte secondary battery is the electrode plate according to the present invention, and it is particularly preferable that each of the positive electrode and the negative electrode is the electrode plate according to the present invention, respectively.

The positive electrode before the porous film is formed can include a positive electrode core member and a positive electrode material mixture layer formed thereon. The positive electrode material mixture layer can include a positive electrode active material and, as necessary, a conductive agent and a binder.

The positive electrode active material included in the positive electrode is not particularly limited as long as it is a material that can absorb and desorb lithium ions and that can perform charge and discharge reactions. For example, a lithium composite oxide can be used as the positive electrode active material. Specifically, a composite oxide represented by the composition formula: $LiMO_2$ or $LiM_2O_4$, wherein M is at least one selected from the transition metals such as Co, Mn, Ni, Fe etc. can be used. Also, a composite oxide in which a portion of the transition metal is replaced by other element such as Al, Mg, Li etc. can be used.

As the conductive agent included in the positive electrode, for example a carbon black such as acetylene black (AB) and ketjen black (KB), a graphite material etc. can be used. As the binder, a material which is stable under the positive electrode potential can be used. As the binder included in the positive electrode, for example polyvinylidene fluoride (PVDF), modified acryl rubber, polytetrafluoroethylene etc. can be used. As the positive electrode core member, a metal foil which is stable under the positive electrode potential can be used without any particular restriction. As the positive electrode core member, an aluminum foil etc. can be used.

The positive electrode before the porous film is formed thereon can be produced in the following manner, for example. A positive electrode active material, a conductive agent and a binder as necessary, and an appropriate amount of a dispersion medium are kneaded to prepare a positive electrode paste. The obtained positive electrode paste is applied onto the positive electrode core member, which is then dried, rolled into a prescribed thickness and cut into a prescribed size thereby to obtain the positive electrode.

It is noted that the positive electrode paste can include a thickener for stabilization. As the thickener, a cellulose resin such as carboxymethylcellulose (CMC) can be used, for example.

The negative electrode before the porous film is formed can include a negative electrode core member and a negative electrode material mixture layer formed thereon. The negative electrode material mixture layer can include a negative electrode active material and, as necessary, a binder and the like.

As the negative electrode active material, a material which can absorb and desorb lithium ions can be used. Examples of the above material include graphite, silicide, titanium alloy material etc. These materials can be used singly or in combination of two or more thereof.

As the binder included in the negative electrode, a material which is stable under the negative electrode potential can be used. Examples of such a material include polyvinylidene fluoride (PVDF), styrene-butadiene copolymer rubber (SBR) etc. As the negative electrode core member, a metal foil which is stable under the negative electrode potential can be used without any particular restriction. As the negative electrode core member, a copper foil and the like can be used.

The negative electrode before the porous film is formed can be produced in the same manner as the positive electrode. Specifically, a negative electrode active material, a binder as necessary, and an appropriate amount of a dispersion medium are kneaded to prepare a negative electrode paste. The obtained negative electrode paste is applied onto a negative electrode core member, which is then dried, rolled in a prescribed thickness and cut into a prescribed size thereby to obtain the negative electrode.

A thickener such as carboxymethylcellulose (CMC) can be added to the negative electrode paste in the same manner as in the positive electrode paste.

As the separator, a microporous film which has high retaining ability of the non-aqueous electrolyte and which is stable under the potential of the positive electrode and the negative electrode can be used. As the constituent material of the separator, polypropylene, polyethylene, polyimide, polyamide etc. can be used.

The non-aqueous electrolyte can comprise a non-aqueous solvent and a solute dissolved therein. As the non-aqueous solvent, for example, ethylene carbonate, propylene carbonate, dimethyl carbonate, diethyl carbonate, methyl ethyl carbonate etc. can be used without limitation thereto. These non-aqueous solvents can be used singly or in combination of two or more thereof.

Examples of the solute include $LiPF_6$, $LiBF_4$, $LiCl_4$, $LiAlCl_4$, $LiSbF_6$, LiSCN, LiCl, $LiCF_3SO_3$, $LiCF_3CO_2$, $Li(CF_2SO_2)_2$. $LiAsF_6$, $LiN(CF_3SO_2)_2$, $LiB_{10}Cl_{10}$ and imides. These can be used singly or in combination of two or more of them.

The non-aqueous electrolyte secondary battery including the electrode plate according to the present invention can be produced in the following manner, for example.

In the non-aqueous electrolyte secondary battery according to the present invention, the positive electrode and the negative electrode are arranged as shown in FIG. 2. Specifically, the positive electrode and the negative electrode are arranged in such a manner that the positive electrode material mixture layer and the negative electrode material mixture layer are opposed to each other with the separator interposed therebetween. At this time, the exposed part of the positive electrode core member and the exposed part of the negative electrode core member are disposed in the direction opposite to each other.

As described in the above, it is preferable that at least one of the positive electrode and the negative electrode is the electrode plate according to the present invention.

Also, the electrode group to be produced may be of a laminate type or a wound type.

Next, a positive electrode current collector terminal and a negative electrode current collector terminal are welded, respectively, to the exposed part of the positive electrode core member and the exposed part of the negative electrode core member of the obtained electrode group. As the method for welding the current collector terminals to the exposed part of the core member, laser welding, ultrasonic welding, resistance welding, TIG welding etc. can be used without limitation thereto.

Subsequently, the electrode group with the current collector terminals connected thereto is housed into a battery case, the non-aqueous electrolyte is introduced into the battery case, the opening of the battery case is sealed with a sealing plate thereby to obtain the non-aqueous electrolyte secondary battery.

EXAMPLES

In the following, the present invention will be described on the basis of examples. The present invention is not limited to the following examples.

Comparative Example 1

Manufacture of Negative Electrode

As the negative electrode active material, artificial graphite (MPG manufactured by Mitsubishi Chemical Corporation)

was used. Styrene-butadiene copolymer rubber was used as the binder and carboxymethyl cellulose was used as the thickener. Using these materials, a negative electrode material mixture paste was prepared in the following manner. In the preparation of the negative electrode material mixture paste, with respect to the binder, an aqueous dispersion of styrene-butadiene copolymer rubber (BM400B manufactured by Zeon Corporation) was used.

The negative electrode active material, the binder and the thickener were mixed in a weight ratio of 93:3:1. The aqueous dispersion of styrene-butadiene copolymer rubber was added in such a manner that the solid content was 3 parts by weight.

Next, the obtained mixture and water were mixed in a weight ratio of 1:1 to obtain the negative electrode material mixture paste. The obtained negative electrode material mixture paste was applied onto both surfaces of the negative electrode core member comprising a copper foil having a thickness of 10 μm, which was then dried and rolled. At this time, the negative electrode material mixture paste was applied onto the negative electrode core member in such a manner that an exposed part of the core member was formed along one side which is parallel to the longitudinal direction thereof. The width of the exposed part in the width direction of the negative electrode core member was 10 mm.

The obtained electrode plate was subjected to slit processing to give a negative electrode plate having 0.077 mm in thickness, 124 mm in width (width of the material mixture layer was 114 mm) and 3300 mm in length was obtained.

The width of the portion of the negative electrode material mixture layer having a smaller thickness formed on the side of the exposed part of the negative electrode core member was about 2 mm.

In the following manner, a porous film comprising an inorganic oxide filler and a binder was formed on the obtained negative electrode plate.

Alumina having a median diameter of 0.3 μm and a modified polyacrylonitrile rubber binder (BM-720H manufactured by Zeon Corporation (solid content 8% by weight)) were mixed in a weight ratio of 8:3. The obtained mixture was kneaded with a planetary mixer with an appropriate amount of NMP to prepare a white colored porous film slurry. The porous film slurry was applied onto a portion of the exposed part of the negative electrode core member and onto the negative electrode material mixture layer in a thickness of 4 mm per one surface of the negative electrode plate, which was then dried to form a porous film. The width of the exposed part of the negative electrode core member after the formation of the porous film was 6 mm.

The application of the porous film paste was performed with the gravure roll method. The applied weight (applied thickness) of the porous film slurry was adjusted according to the depth of a groove formed by the surface processing with the gravure roll, and the location of the edges where the paste was applied were adjusted according to the location of the edges of the gravure roll.

As described in the above, the negative electrode comprising a porous film was obtained.

Figure 1:
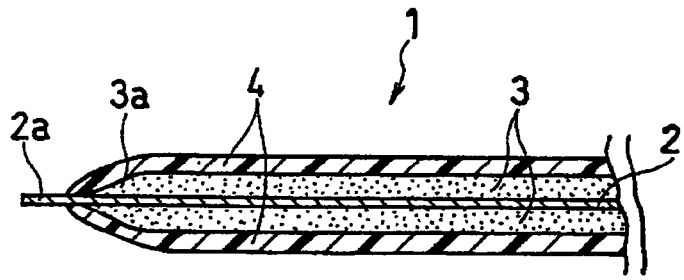
FIG. 1 is a vertical sectional view showing the structure of a conventional electrode plate.

As shown in FIG. 1, in the cross section in the width direction of the obtained negative electrode, the thickness of the porous film formed in the vicinity of the central portion of the negative electrode material mixture layer was almost the same as the thickness of the porous film formed on the portion having a smaller thickness of the negative electrode material mixture layer.

(Production of Positive Electrode)

A lithium nickel composite oxide represented by the composition formula: $LiNi_{0.7}Co_{0.2}Al_{0.1}O_2$ was used as the positive electrode active material. The lithium nickel composite oxide was prepared in the following manner.

Cobalt sulfate and aluminum sulfate were added to an aqueous solution of $NiSO_4$ having a prescribed concentration in a prescribed ratio to prepare a saturated aqueous solution. An aqueous solution of sodium hydroxide was dropped slowly into the saturated aqueous solution while stirring to neutralize the saturated aqueous solution. In this manner, ternary nickel hydroxide $Ni_{0.7}Co_{0.2}Al_{0.1}(OH)_2$ was formed by the coprecipitation method. The above nickel hydroxide was filtered, washed with water and dried at 80° C. The obtained nickel hydroxide has a mean particle size of 10 μm.

Subsequently, the obtained $Ni_{0.7}Co_{0.2}Al_{0.1}(OH)_2$ was heat-treated in the air at 900° C. for 10 hours to obtain nickel oxide $Ni_{0.7}Co_{0.2}Al_{0.1}O$. The obtained nickel oxide was confirmed to have a single phase by the powder X-ray diffraction.

Next, the above nickel oxide and lithium hydroxide monohydrate were mixed in such a manner that the sum of the number of atoms of Ni, Co and Al was equal to the number of atoms of Li, and the obtained mixture was heat-treated in a dry air at 800° C. for 10 hours to obtain an aimed product $LiNi_{0.7}Co_{0.2}Al_{0.1}O_2$. The obtained lithium nickel composite oxide was pulverized and classified to obtain a powder of positive electrode active material.

It was confirmed that the obtained lithium nickel composite oxide has a single phase hexagonal layered structure and Co and Al were incorporated into the composite oxide to form a solid solution.

Next, a positive electrode material mixture paste was prepared with the obtained positive electrode active material. Acetylene black (AB) was used as a conductive agent contained in the positive electrode material mixture and polyvinylidene fluoride (PVDF) was used as a binder. Specifically, the positive electrode material mixture paste was prepared in the following manner.

The positive electrode active material, AB (Denka Black manufactured by Denki Kagaku Kogyo Co., Ltd.) and PVDF (KF polymer #1320 manufactured by Kureha Corporation) were mixed in a weight ratio of 90:5:6 (solid content ratio), an appropriate amount of n-methyl-2-pyrrolidone (NMP) was added to the obtained mixture as a dispersion medium, which was then kneaded to prepare the positive electrode material mixture paste.

The obtained positive electrode material mixture paste was applied onto both surfaces of the positive electrode core member made of an aluminum foil having a thickness of 15 μm, which was then dried and rolled. At this time, the positive electrode material mixture paste was applied in such a manner that the exposed part of the core member was formed along one side which is parallel to the longitudinal direction thereof. The width of the exposed part in the width direction of the positive electrode core member was 10 mm. The obtained positive electrode plate was subjected to slit processing to produce a positive electrode having a thickness of 0.078 mm, a width of 120 mm (material mixture width 110 mm) and a length of 3090 mm.

The width of the portion of the positive electrode material mixture layer having a smaller thickness formed on the side of the exposed part of the positive electrode core member was about 2 mm.

(Assembly of Battery)

In order to remove remained moisture, the positive electrode was dried in the air at 100° C. for 10 hours and the negative electrode was dried in a drying furnace at 80° C. for 10 hours.

The positive electrode and the negative electrode after drying were laminated with a separator interposed between them to obtain a laminate. As the separator, a polyethylene-polypropylene composite film (2320 manufactured by Celgard, LLC) was used. In the laminate, the positive electrode and the negative electrode were arranged in such a manner that the exposed part of the positive electrode core member and the exposed part of the negative electrode core member were located in the direction opposite to each other, and the end of the negative electrode material mixture layer on the side of the exposed part of the negative electrode core member was located 3 mm outside the end of the positive electrode material mixture layer on the side of the exposed part of the negative electrode core member.

Next, the obtained laminate was wound up in a spiral shape to form a wound-type electrode group. In the obtained electrode group, the exposed part of the positive electrode core member was placed at one end face in the direction of winding axis and the exposed part of the negative electrode core member was placed at the other end face.

A positive electrode current collector terminal made of aluminum having a thickness of 0.3 mm and a diameter of 30 mm was laser welded with a YAG laser welding machine (ASER-MODEL YP500B manufactured by FANUC Ltd.) to the exposed part of the positive electrode core member. An accumulated output amount at the time of the welding was 180 W. A negative electrode current collector terminal made of nickel having a thickness of 0.2 mm and a diameter of 30 mm was laser welded to the exposed part of the negative electrode core member. An accumulated output amount at the time of the welding was 120 W.

The above electrode group was housed in a battery case made of iron with a nickel-plated surface in such a manner that the negative electrode current collector terminal was brought in contact with an inner bottom surface of the battery case. The positive electrode current collector terminal was laser welded to a sealing plate made of aluminum and the negative electrode current collector terminal was resistance welded to the inner bottom surface of the battery case.

Next, a non-aqueous electrolyte was poured into the battery case. The non-aqueous electrolyte was prepared by dissolving $LiPF_6$ at a concentration of 1 mol/l in a mixed solvent containing ethylene carbonate, diethyl carbonate and dimethyl carbonate in a weight ratio of 20:40:40.

Thereafter, an opening part of the battery case was sealed with a sealing plate to produce a non-aqueous electrolyte secondary battery. The obtained battery was designated as a battery of Comparative Example 1.

Comparative Example 2

Supposing an occurrence of displacement of winding during the use of the battery, in the laminate, the location of the positive electrode was moved, parallel to the width direction of the laminate, 4 mm to the side of the exposed part of the negative electrode core member (that is, to the direction A of FIG. 2). Specifically, the positive electrode was moved in such a manner that the end of the positive electrode material mixture layer on the side of the exposed part of the negative electrode core member was located 1 mm outside the end of the negative electrode material mixture layer on the side of the exposed part of the negative electrode core member. Except for this, a battery of Comparative Example 2 was obtained in the same manner as in Comparative Example 1.

Example 1

At the time of forming the porous film, the amount of the porous film slurry applied onto the portion of the negative electrode material mixture layer having a smaller thickness and a part of the exposed part of the negative electrode core member adjacent to it was rendered larger by enlarging the depth of the groove of the portion of the gravure roll corresponding to the portion of the negative electrode material mixture layer having a smaller thickness on the side of the exposed part of the core member and the vicinity thereof. In this manner, the negative electrode having a vertical cross section as shown is FIG. 3 was produced. In the obtained negative electrode, the sum of the thickness of the core member, the thickness of the material mixture layer and the thickness of the porous film at the largest thickness position of the material mixture layer on the edge portion on the side of the exposed part of the core member was almost the same as the sum of the thickness of the core member, the thickness of the material mixture layer and the thickness of the porous film at the central portion of the material mixture layer.

A battery of Example 1 was produced in the same manner as in Comparative Example 1 except for using the above negative electrode.

Example 2

In the same manner as in Comparative Example 2, in the laminate, the location of the positive electrode was moved, parallel to the width direction of the laminate, 4 mm to the side of the exposed part of the negative electrode core member. Specifically, the positive electrode was moved in such a manner that the end of the positive electrode material mixture layer on the side of the exposed part of the negative electrode core member was located 1 mm outside the end of the negative electrode material mixture layer on the side of the exposed part of the negative electrode core member. A battery of Example 2 was produced in the same manner as in Example 1 except for this.

Comparative Example 3

A porous film was formed on a positive electrode in the same manner as in Comparative Example 1. A negative electrode was produced in the same manner as in Comparative Example 1 except for not forming a porous film. A battery of Comparative Example 3 was produced in the same manner as in Comparative Example 1 except for using the above positive electrode and the above negative electrode.

Comparative Example 4

In the laminate, the location of the positive electrode was moved, parallel to the width direction of the laminate, toward the side of the exposed part of the positive electrode core member (direction B in FIG. 2). Specifically, the positive electrode was moved in such a manner that the end of the positive electrode material mixture layer on the side of the exposed part of the positive electrode core member was located 1 mm outside the end of the negative electrode material mixture layer on the side of the exposed part of the positive electrode core member. A battery of Comparative Example 4 was produced in the same manner as in Comparative Example 3 except for this.

Example 3

A porous film was formed on a positive electrode in the same manner as in Example 1. A negative electrode was produced in the same manner as in Comparative Example 1 except for not forming a porous film.

In the obtained positive electrode, the sum of the thickness of the core member, the thickness of the material mixture layer and the thickness of the porous film at the largest thickness position on the edge portion of the material mixture layer on the side of the exposed part of the core member was almost the same as the sum of the thickness of the core member, the thickness of the material mixture layer and the thickness of the porous film at the central portion of the material mixture layer.

A battery of Example 3 was produced in the same manner as in Comparative Example 1 except for using the above positive electrode and the negative electrode.

Example 4

In the same manner as in Comparative Example 4, in the laminate, the positive electrode was moved in such a manner that the end of the positive electrode material mixture layer on the side of the exposed part of the positive electrode core member was located 1 mm outside the end of the negative electrode material mixture layer on the side of the exposed part of the positive electrode core member. A battery of Example 4 was produced in the same manner as in Example 3 except for this.

Table 1 shows presence or absence of the porous film, the thickness of the porous film formed on the edge face of the material mixture layer on the side of the exposed part of the core member (first thickness) and presence or absence of displacement of winding in each electrode of the batteries of Examples 1 to 4 and Comparative Examples 1 to 4. It is noted, with regard to the first thickness of the porous film in Table 1, "normal" means that the first thickness of the porous film is almost the same as the second thickness of the porous film. "Thick type" means that the first thickness of the porous film is larger than the second thickness of the porous film.

TABLE 1

| Battery | Positive electrode | | Negative electrode | | Presence or absense of displacement of winding |
|---|---|---|---|---|---|
| | Porous film | First thickness of porous film | Porous film | First thickness of porous film | |
| Co. Ex. 1 | Absent | — | Present | Normal | Absent |
| Co. Ex. 2 | Absent | — | Present | Normal | Present |
| Ex. 1 | Absent | — | Present | Thick type | Absent |
| Ex. 2 | Absent | — | Present | Tick type | Present |
| Co. Ex. 3 | Present | Normal | Absent | — | Absent |
| Co. Ex. 4 | Present | Normal | Absent | — | Present |
| Ex. 3 | Present | Thick type | Absent | — | Absent |
| Ex. 4 | Present | Thick type | Absent | — | Present |

[Evaluation]
(Charge-Discharge Cycle Tests)

The batteries of Examples 1 to 4 and Comparative Examples 1 to 4 were respectively charged under an environment of 25° C. at a constant current of C/5 rate until the battery voltage reached 4.2 V, and subsequently discharged until the battery voltage decreased to 2.5 V. Three cycles of the above charge and discharge at a constant current was repeated. Thereafter, each battery was charged under an environment of 25° C. at a constant current of C/5 rate until the battery voltage reached 4.2 V. Subsequently, each battery in the charged state was left for a week under an environment of 45° C. Comparing open circuit voltages (OCV) before and after leaving the batteries at 45° C., it was confirmed that no short circuit occurred.

Twenty-five cells each of the batteries of Examples 1 to 4 and Comparative Examples 1 to 4 were prepared. Each cell was subjected to charge-discharge cycle tests where the charge and discharge were done at a constant current of 2 C rate with an upper limit voltage of 4.2 V and a lower limit voltage of 2.5 V under an environment of 25° C. The above charge-discharge cycle was repeated for 300 times. During these tests, after every 25 cycles, each cell was left in the charged state for 24 hours and changes in OCV before and after leaving were measured to confirm the presence or absence of internal short circuiting. Table 2 shows the number of cells in which internal short circuiting occurred.

TABLE 2

| Battery | Number of cells in which internal short circuiting occurred (pieces) |
|---|---|
| Comparative Example 1 | 0 |
| Comparative Example 2 | 7 |
| Example 1 | 0 |
| Example 2 | 0 |
| Comparative Example 3 | 0 |
| Comparative Example 4 | 5 |
| Example 3 | 0 |
| Example 4 | 0 |

(Crush Tests)

Next, 10 cells each of the batteries of Examples and Comparative Examples in which no internal short circuiting was confirmed in the charge-discharge cycle tests were disassembled to observe the state of the negative electrode.

As a result, in the batteries of Comparative Examples 2 and 4 and Example 4 in which the electrode group is in the state of displacement of winding, a deposition of metallic lithium was observed on the edge portion of the negative electrode on the side opposite to the side of the exposed part of the core member. It is noted that a deposition of metallic lithium was not observed in the battery of Example 2. The reason for this is considered that, in the battery of Example 2, as the first thickness of the porous film is larger than the second thickness, deposited metallic lithium did not come outside the porous film.

In the batteries of Examples 1 and 3 and Comparative Examples 1 and 3 in which the electrode group is not in the state of displacement of winding, a deposition of metallic lithium was not observed.

From the above observation, the location where metallic lithium was deposited after the charge-discharge cycle tests was confirmed. Therefore, 20 cells each of the Examples and Comparative Examples after being subjected to the above charge-discharge cycle tests were prepared and each cell was subjected to crush tests as follows.

Specifically, using a cylindrical bar made of a metal having a diameter of 10 mm, the bar was placed in such a manner that the length direction of the bar was perpendicular to the height direction of the battery, and the bar was moved at a moving rate of 3 mm/min. In this manner, each cell was crushed. Table 3 shows the number of cells which caused smoking.

The place crushed was the vicinity of the edge portion of the negative electrode material mixture layer on the side of the negative electrode current collector terminal in the battery of Comparative Example 1 and 2 and Examples 1 and 2. In the batteries of Comparative Examples 3 and 4 and Examples 3 and 4, the place crushed was the vicinity of the edge portion of the negative electrode on the side of the positive electrode current collector terminal.

TABLE 3

| Battery | Number of cells which caused smoking (pieces) |
| --- | --- |
| Comparative Example 1 | 2 |
| Comparative Example 2 | 8 |
| Example 1 | 0 |
| Example 2 | 0 |
| Comparative Example 3 | 3 |
| Comparative Example 4 | 7 |
| Example 3 | 0 |
| Example 4 | 0 |

From the results of the Comparative Examples, it is found that metallic lithium may possibly be deposited on the negative electrode in case displacement of winding occurs in the electrode group comprising the conventional electrode plate only. Further, in case metallic lithium is deposited on the negative electrode, when the battery is deformed by an external force, smoking may be caused due to internal short circuiting.

On the other hand, it is found that, in the batteries of the Examples comprising the electrode plate according to the present invention as the positive electrode or the negative electrode, smoking due to internal short circuiting can be prevented. The reason for this is considered as follows.

In the negative electrode on which the exposed part of the core member is formed along one side which is parallel to the longitudinal direction (negative electrode for high-output purposes), the edge portion of the material mixture layer on the side of the exposed part of the core member has a smaller thickness. For this reason, the amount of the negative electrode active material contained in this portion is smaller. In the case where displacement of winding occurs, for example, and the portion of the material mixture layer having a smaller amount of the negative electrode active material is opposed to the positive electrode material mixture layer, metallic lithium may possibly be deposited on the above portion having a smaller amount of the negative electrode active material. When the battery in which metallic lithium is deposited on the negative electrode is deformed by an external force and an internal short circuit occurs, as the amount of generated heat is large, smoking may possibly be caused in the conventional battery. However, as in the present invention, by rendering larger the thickness of the porous film formed on the edge portion of the negative electrode material mixture layer on the side of the exposed part of the core member (portion having a smaller amount of the negative electrode active material), occurrence of internal short circuiting can be prevented. Even when internal short circuiting occurs, enlargement of short-circuited area can be inhibited with the porous film. For this reason, smoking caused by internal short circuiting can be prevented by using the electrode plate according to the present invention.

Also in the positive electrode, as the edge portion of the material mixture layer on the side of the exposed part of the core member has a smaller thickness, the amount of the positive electrode active material contained therein is smaller. In case displacement of winding occurs and the portion of the material mixture layer having a smaller amount of the positive electrode active material is located outside the end of the opposed negative electrode, metallic lithium may possibly be deposited on the portion of the negative electrode including the above end. Even in such a case, occurrence of internal short circuiting can be prevented by rendering larger the thickness of the porous film formed on the portion of the positive electrode material mixture layer having a smaller amount of the positive electrode active material. Even when internal short circuiting occurs, enlargement of short-circuited area can be prevented with the porous film.

It is considered that the larger the first thickness of the porous film is, the higher its heat-resisting property becomes and its safety can be further improved. Using the electrode plate (the electrode plate as in FIG. 4) wherein the thickness of the electrode plate at the edge face of the material mixture layer on the side of the exposed part of the core member is rendered larger than the thickness of the electrode plate at the central portion of the material mixture layer, batteries were produced and subjected to the above-mentioned charge-discharge cycle tests and crush tests; however, no battery caused smoking. Further, in the case where the above electrode plate was used, no battery caused smoking even if the electrode group was in the state of displacement of winding. In consequence, the same effect as in the Examples 1 to 4 was obtained.

It is noted that in general, at the time of mass-production processes, electrode plates having a length of from several hundreds to several thousands of meters are produced. In the case where an electrode plate having the structure as shown in FIG. 4 is wound up in a roll shape, the electrode plate may possibly be cut when several tens of meters of the electrode plate is wound up. The reason for this is that, since the thickness of the electrode plate varies according to the location, distortion of the electrode plate becomes larger as more and more the electrode plate is wound up. For this reason, it is preferable that the sum of the thickness of the core member, the thickness of the material mixture layer and the thickness of the porous film at the edge face of the material mixture layer on the side of the exposed part of the core member is equal to or less than the sum of the thickness of the core member, the thickness of the material mixture layer and the thickness of the porous film at the central portion of the material mixture layer.

In the case where the electrode plates are displaced with each other in such a manner that the positive electrode is moved to the side of the exposed part of the negative electrode core member, metallic lithium may possibly be deposited on the edge portion of the negative electrode material mixture layer on the side of the exposed part of the negative electrode core member. In the case where the electrode plates are displaced with each other in such a manner that the positive electrode is moved to the side opposite to the exposed part of the negative electrode core member, metallic lithium may possibly be deposited on the edge portion of the negative electrode on the side opposite to the side of the exposed part of the negative electrode core member.

From the results of the above examples, it is found that, in the former case, the reliability of the battery can be further improved by forming the porous film on the edge portion of the negative electrode material mixture layer on the side of the exposed part of the negative electrode core member; in the latter case, the reliability of the battery can be further improved by forming the porous film on the edge portion of the positive electrode material mixture layer on the side of the exposed part of the positive electrode core member.

Moreover, by using the electrode plate according to the present invention in both of the positive electrode and the negative electrode, the reliability of the battery can be further improved no matter in which direction the electrode plates are displaced with each other in the electrode group. In consequence, it is found that, by using the electrode plate according to the present invention in both of the positive electrode and the negative electrode, the reliability of the battery can be remarkably improved.

In the above examples, alumina was used as the insulating filler. It was found that the same effects as in the case of using alumina was obtained in the case where magnesia was used as the insulating filler.

INDUSTRIAL APPLICABILITY

According to the present invention, a non-aqueous electrolyte secondary battery having a higher reliability, for example a battery applied for high-output purposes can be provided. The above non-aqueous electrolyte secondary battery can be suitably used for example as a power source for electric tools, hybrid electric vehicles and the like.

The invention claimed is:

1. An electrode plate for a non-aqueous electrolyte secondary battery, comprising a long core member and a material mixture layer formed on said core member, wherein:
said electrode plate has an exposed part of said core member formed along one side which is parallel to the longitudinal direction of said core member,
said material mixture layer comprises a material that can absorb and desorb lithium ions,
a porous film is formed on said material mixture layer and at least a part of said exposed part of said core member adjacent to an edge face of said material mixture layer, said exposed part being on the same side as the face of said core member on which said material mixture layer is formed,
a slope is created at an edge portion of said material mixture layer, said edge portion being located on the side of said exposed part of said core member and said slope being created by a thickness of said edge portion made gradually smaller toward the edge of said edge portion, and
a thickness of said porous film located at said edge portion, in a direction normal to said slope, is greater than a thickness of said porous film located at a central portion of said material mixture layer in the width direction thereof.

2. The electrode plate for a non-aqueous electrolyte secondary battery in accordance with claim 1, wherein in the direction perpendicular to said core member, the sum of the thickness of said core member, the thickness of said material mixture layer and the thickness of said porous film at said edge face of said material mixture layer is equal to or less than the sum of the thickness of said core member, the thickness of said material mixture layer and the thickness of said porous film at said central portion of said material mixture layer.

3. The electrode plate for a non-aqueous electrolyte secondary battery in accordance with claim 1, wherein said porous film comprises at least one selected from the group consisting of a film including an insulating filler and a binder and a film including a heat-resistant resin.

4. A non-aqueous electrolyte secondary battery comprising an electrode group including a positive electrode, a negative electrode and a separator interposed between said positive electrode and said negative electrode, a non-aqueous electrolyte and a battery case housing said electrode group and said non-aqueous electrolyte,
wherein at least one of said positive electrode and said negative electrode is the electrode plate in accordance with claim 1.

5. The non-aqueous electrolyte secondary battery in accordance with claim 4, wherein said electrode group is a wound-type electrode group or a laminate-type electrode group.

* * * * *